Patented July 30, 1929.

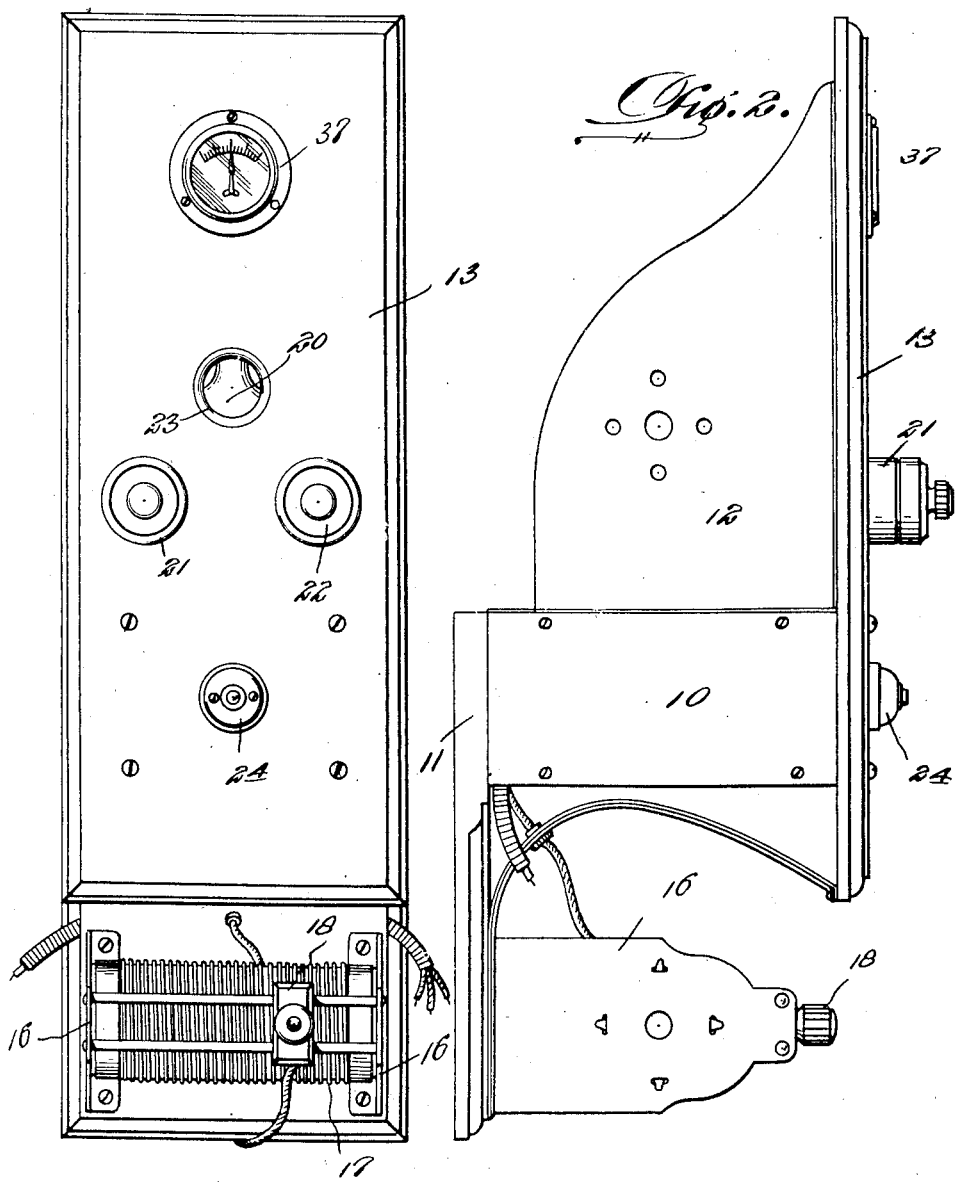

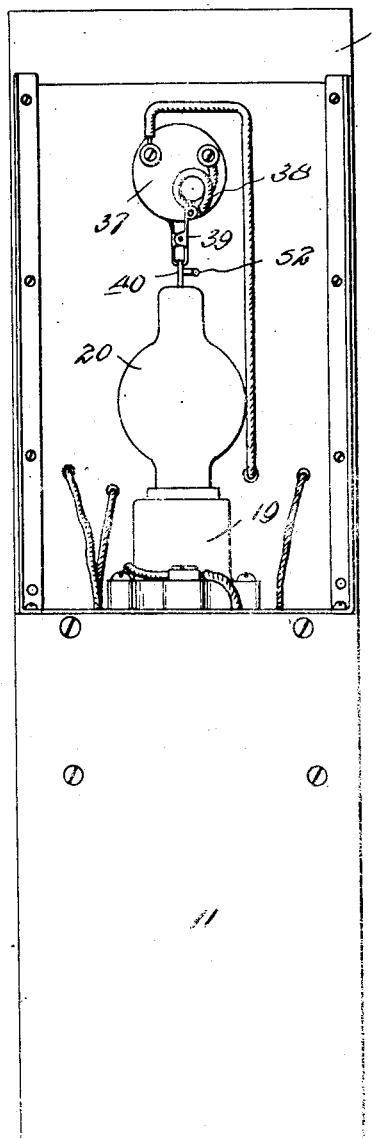
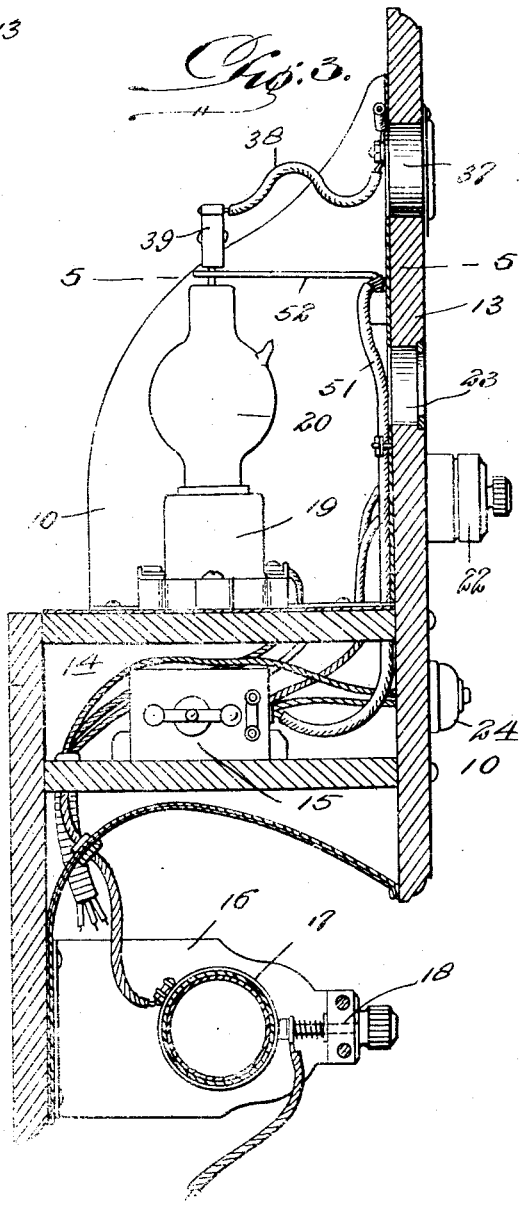

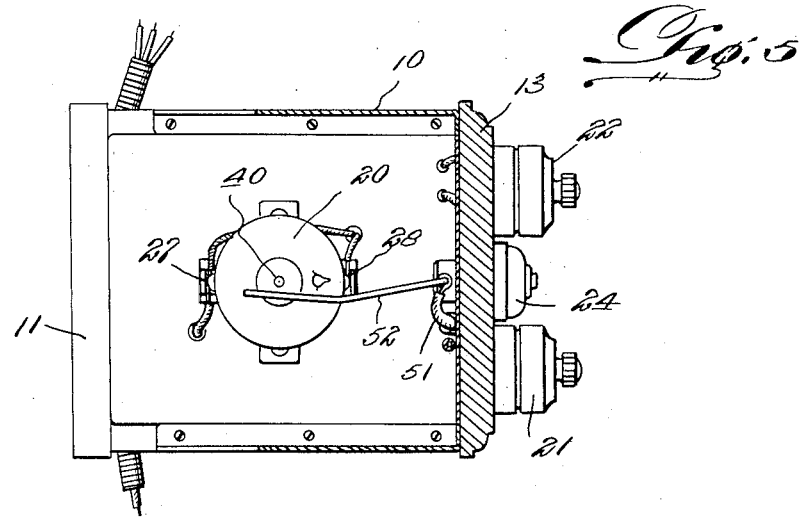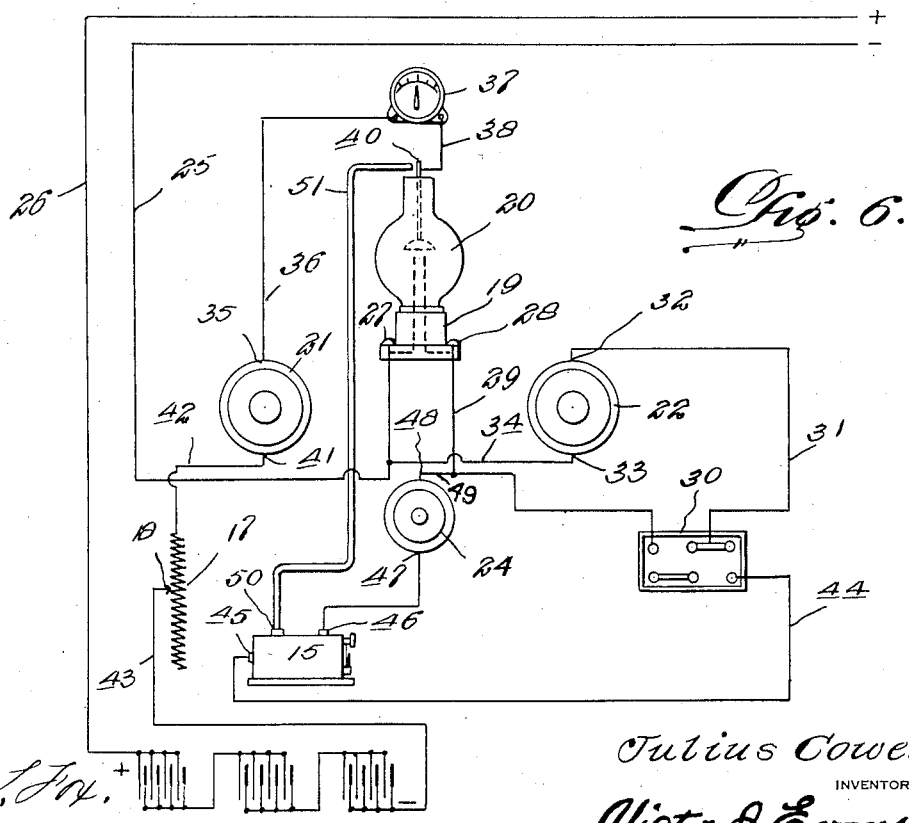

1,722,900

UNITED STATES PATENT OFFICE.

JULIUS COWEN, OF SAN ANTONIO, TEXAS.

BATTERY-CHARGING DEVICE.

Application filed June 30, 1922. Serial No. 571,874.

This invention relates to electrical apparatus, particularly to devices for charging storage batteries, and has for its object the provision of a novel apparatus embodying the use of a rectifying bulb, either good or burnt out, for the purpose of converting the alternating current of a power line into interrupted direct current suitable for charging storage batteries.

An important object is the provision of an apparatus of this character which is provided with means for causing a burnt out bulb to operate so as to have its rectifying action.

Still another object is the provision of a device of this character having a plurality of control switches whereby the heating of the filament may be effected, whereby the rectifying action may be utilized and whereby a spark may be caused to jump to one of the electrodes of the bulb for effecting the necessary heating thereof in case a burnt out bulb is used.

A further object is the provision of an apparatus of this character which is of such construction that it is capable of charging a large number of batteries arranged either in series or in parallel, ample means being provided also for varying the charging rate.

An additional object is the provision of an apparatus of this character which will be simple and inexpensive in manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a front elevation of the device,
Figure 2 is a side view,
Figure 3 is a vertical section,
Figure 4 is a rear view,
Figure 5 is a horizontal section on the line 5—5 of Figure 4,
Figure 6 is a diagram of the electric circuit.

Referring more particularly to the drawings the numeral 10 designates a casing including a supporting back 11, sides 12 and a front panel 13. This casing is formed to provide a compartment 14 within which is located a vibrating coil 15. Mounted on the lower projecting end of the back member 11 is a bracket 16 which supports a rheostat 17 having a slider 18.

Mounted upon the top of the partition which forms the compartment 14 is a socket 19 for holding a rectifying bulb or vacuum tube 20 of ordinary type. Mounted on the panel 13 are switches 21 and 22 of the snap type and it should be mentioned that this panel is formed with a sight opening 23 which will permit a view of the bulb. Also mounted on the panel is a push button 24.

The arrangement and electrical connection of the parts is as follows: The numerals 25 and 26 designate the line wires of a 110 or 220 volt alternating current power system. The wire 25 is connected with one terminal 27 of the socket 19 and the wire 26 constitutes one of the feed wires for charging storage batteries. Connected with the other terminal 28 of the socket is a wire 29 which leads to one terminal of a storage battery 30 which is for the purpose of energizing the globe or bulb. The other terminal of this storage battery 30 is connected by a wire 31 with one terminal 32 of the switch 22 which has its other terminal 33 connected by a wire 34 with the wire 25 leading to the terminal 27. Connected with one terminal 35 of the switch 21 is a wire 36 which leads to one terminal of an ammeter mounted on the panel and leading from the other terminal of this ammeter is a wire 38 terminating in a clip 39 which is engaged upon the upper end of one electrode 40 of the bulb. The other terminal 41 of the switch 21 is connected by a wire 42 with one end of the winding of the rheostat 17. The slider 18 of the rheostat has connected therewith a wire 43 which constitutes the other feed wire for the storage battery to be charged. The storage batteries on charge are designated by the letter A and they are here shown as arranged in series.

It should be stated that the wires 29 and 31 leading off from the storage battery are connected thereto at such points as to give a four volt potential. Connected with the six volt terminal of the storage battery 30 is a wire 44 which leads to one terminal 45 of the vibrator coil which is connected with one terminal 47 of the push button which has its other terminal 48 connected by a wire 49 with the wire 29.

Connected with the remaining terminal 50 of the vibrating coil is a wire 51 which extends upwardly to the rear of the panel and which is connected with a rotatably movable arm 52 arranged in slightly spaced relation to the electrode 40 of the bulb for a purpose to be explained.

In the use of the device it will be seen that on a 110 volt circuit, 16 six volt storage batteries may be arranged in series and charged at a rate of 10 amperes, or on a 220 volt circuit, 30 six volt batteries may be charged at the same rate. These storage batteries A are illustrated as being connected in series though if desired they may be arranged in parallel whereupon the charging rate may be doubled or the number of batteries may be doubled.

In setting the device in operation it is first necessary, in case a good bulb 20 is used, to close the switch 22 so as to complete the four volt circuit from the storage battery 30 through the filament of the lamp for initially heating the filament to start the bulb operating. The switch 21 is then turned on and the switch 22 immediately turned off whereupon the bulb will continue to operate and to rectify the current passing through it from the alternating current line so an interrupted direct current will be fed to the batteries A on charge through the wires 26 and 43, the former being connected with the positive terminal of the first battery and the latter being connected with the negative terminal of the last battery.

In case a burnt out bulb is used, it is first necessary to turn on the switch 21 and then press the push button 24. This will close the six volt circuit from the storage battery 30 through the vibrating coil 15 and the electrode 40 so that a spark will jump the gap between the arm 52 connected with the wire 51 and the electrode 40. The push button is held until the globe or bulb heats and starts operating, whereupon the push button is released and the bulb will continue its rectifying action for charging the storage batteries on charge. The charging rate is regulated by moving the slider 18 along the coils of the rheostat 17 so as to vary the resistance in the output.

From the foregoing description and a study of the drawings it will be apparent that I have thus provided a simply constructed and consequently inexpensive apparatus for rectifying alternating current of different potentials for use in charging storage batteries in a very rapid and efficient manner. It is to be observed that a very important feature is the provision of means for utilizing a burnt out tube instead of discarding the tube as is ordinarily done.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In an apparatus for charging storage batteries from an alternating current by means of a rectifying bulb having a broken filament, a connection between one line wire of the alternating current supply and the positive terminal of the storage battery to be charged, a connection between the plate electrode of the bulb and the negative terminal of the storage battery, and means for producing a spark across the break in the filament whereby to excite the bulb, said means comprising a high tension vibrator coil having its primary connected in series with an auxiliary source of direct current and having one terminal of its secondary leading to a point spaced from the plate electrode of the bulb.

2. In an apparatus for charging storage batteries from an alternating current by means of a rectifying bulb having a broken filament, a connection between one line wire of the alternating current supply and the positive terminal of the storage battery to be charged, a connection between the plate electrode of the bulb and the negative terminal of the storage battery, and means for producing a spark across the break in the filament whereby to excite the bulb, said means comprising a high tension vibrator coil having its primary connected in series with an auxiliary source of direct current and having one terminal of its secondary leading to a point spaced from the plate electrode of the bulb, the other terminal of the secondary and one terminal of the primary being both connected with the filament of the bulb.

In testimony whereof I affix my signature at San Antonio, Texas, this the 10th day of June, 1922.

JULIUS COWEN.